(12) United States Patent
Waltner

(10) Patent No.: US 10,689,098 B2
(45) Date of Patent: Jun. 23, 2020

(54) ADAPTIVE LANDING GEAR ASSEMBLY FOR ROTARY WING AIRCRAFT

(71) Applicant: Sikorsky Aircraft Corporation, Stratford, CT (US)

(72) Inventor: Peter James Waltner, Royal Palm Beach, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 157 days.

(21) Appl. No.: 15/580,204

(22) PCT Filed: Jun. 24, 2016

(86) PCT No.: PCT/US2016/039250
§ 371 (c)(1),
(2) Date: Dec. 6, 2017

(87) PCT Pub. No.: WO2016/210265
PCT Pub. Date: Dec. 29, 2016

(65) Prior Publication Data
US 2018/0141644 A1    May 24, 2018

Related U.S. Application Data

(60) Provisional application No. 62/184,527, filed on Jun. 25, 2015.

(51) Int. Cl.
*B64C 25/22*    (2006.01)
*B64C 25/60*    (2006.01)
(Continued)

(52) U.S. Cl.
CPC .............. *B64C 25/22* (2013.01); *B64C 25/10* (2013.01); *B64C 25/26* (2013.01); *B64C 25/32* (2013.01);
(Continued)

(58) Field of Classification Search
CPC .................... B64C 2025/008; B64C 2025/325
See application file for complete search history.

(56) References Cited

U.S. PATENT DOCUMENTS 2,927,747 A * 3/1960 Bennie .................... B64C 25/52
244/17.17
2,933,271 A * 4/1960 Maltby ................. B64C 25/001
244/103 R
(Continued)

FOREIGN PATENT DOCUMENTS

CN    103818548 A    5/2014

OTHER PUBLICATIONS

PCT ISR Written Opinion; International Application No. PCT/US16/39250; International Filing Date: Jun. 24, 2016; dated Sep. 26, 2016; pp. 1-7.
(Continued)

*Primary Examiner* — Joseph W Sanderson
(74) *Attorney, Agent, or Firm* — Cantor Colburn LLP

(57) ABSTRACT

An adaptive landing gear assembly for a rotary wing aircraft, the adaptive landing gear assembly including a controller; a first landing gear support having a first ground contact element; and a second landing gear support having a second ground contact element; the controller independently controlling the first landing gear support and the second landing gear support.

17 Claims, 14 Drawing Sheets

(51) Int. Cl.
  *B64C 25/32* (2006.01)
  *B64C 25/10* (2006.01)
  *B64C 25/26* (2006.01)
  *B64C 25/00* (2006.01)

(52) U.S. Cl.
  CPC ........ *B64C 25/60* (2013.01); *B64C 2025/008* (2013.01); *B64C 2025/325* (2013.01)

(56) References Cited

U.S. PATENT DOCUMENTS

| | | | | |
|---|---|---|---|---|
| 2,959,381 | A * | 11/1960 | Hartel | B64C 25/20 244/102 R |
| 3,011,778 | A | 12/1961 | Yntema | |
| 3,857,533 | A * | 12/1974 | Mason | B64C 25/00 244/17.17 |
| 4,062,507 | A * | 12/1977 | Felder | B64C 25/00 244/17.17 |
| 4,270,711 | A | 6/1981 | Cresap et al. | |
| 4,568,045 | A * | 2/1986 | Mayer | B64C 25/26 244/102 R |
| 4,687,158 | A * | 8/1987 | Kettering | B64C 25/001 244/100 R |
| 5,788,372 | A | 8/1998 | Jones et al. | |
| 6,854,689 | B1 * | 2/2005 | Lindahl | B64C 25/16 244/102 R |
| 7,720,582 | B2 | 5/2010 | Makinadjian | |
| 7,984,873 | B2 | 7/2011 | Lassus et al. | |
| 8,439,303 | B2 * | 5/2013 | Koletzko | B64C 25/52 244/102 A |
| 8,561,945 | B2 * | 10/2013 | Engleder | B64C 25/12 244/102 R |
| 8,727,274 | B2 * | 5/2014 | Sorin | B64C 25/405 244/104 FP |
| 8,820,679 | B2 * | 9/2014 | Martinez | B64C 25/10 244/102 SL |
| 9,008,872 | B2 * | 4/2015 | Pflug | B64C 25/001 701/16 |
| 9,033,276 | B1 | 5/2015 | Calvert | |
| 9,102,402 | B2 * | 8/2015 | Dubois | B64C 25/24 |
| 9,354,635 | B2 * | 5/2016 | Shue | G05D 1/0858 |
| 9,511,852 | B2 * | 12/2016 | Blanpain | B64C 25/20 |
| 9,878,779 | B2 * | 1/2018 | Tsai | G06T 7/11 |
| 10,150,558 | B2 * | 12/2018 | Page | B64C 25/14 |
| 2007/0221783 | A1 | 9/2007 | Parks et al. | |
| 2009/0095839 | A1 * | 4/2009 | Lassus | B64C 25/14 244/102 R |
| 2011/0049293 | A1 * | 3/2011 | Koletzko | B64C 25/52 244/102 A |
| 2011/0163202 | A1 * | 7/2011 | Martinez | B64C 25/10 244/102 SL |
| 2011/0233323 | A1 * | 9/2011 | Engleder | B64C 25/12 244/17.17 |
| 2011/0266388 | A1 * | 11/2011 | Sorin | B64C 25/405 244/50 |
| 2014/0249702 | A1 | 9/2014 | Pflug et al. | |

OTHER PUBLICATIONS

PCT Notification of Transmittal of the International Search Report; International Application No. PCT/US16/39250; International Filing Date: Jun. 24, 2016; dated Sep. 26, 2016; pp. 1-10.

* cited by examiner

Fully Retracted State

Fully Extended State

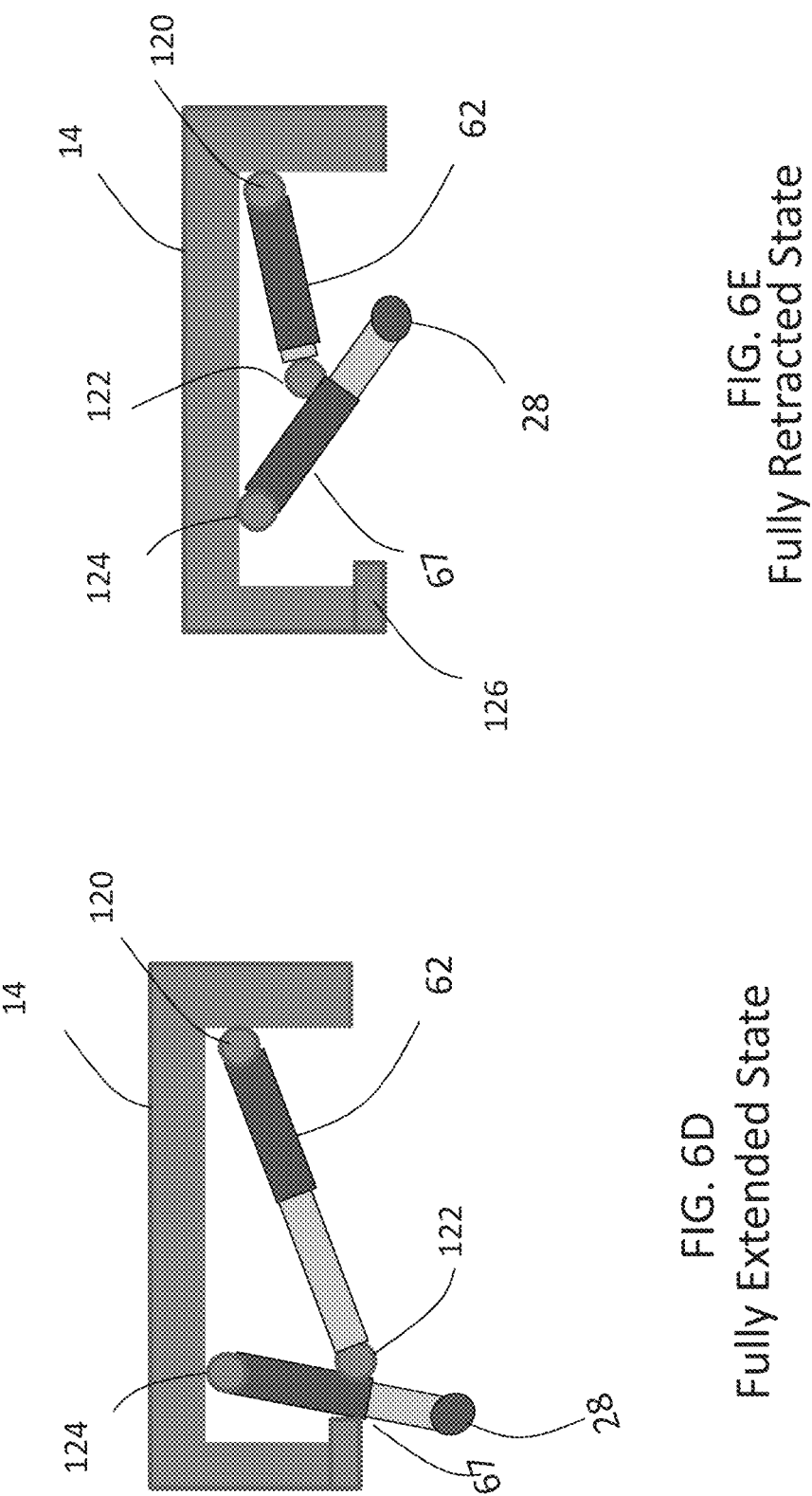

Fully Extended State

Fully Retracted State

4-Bar Linkage Embodiment

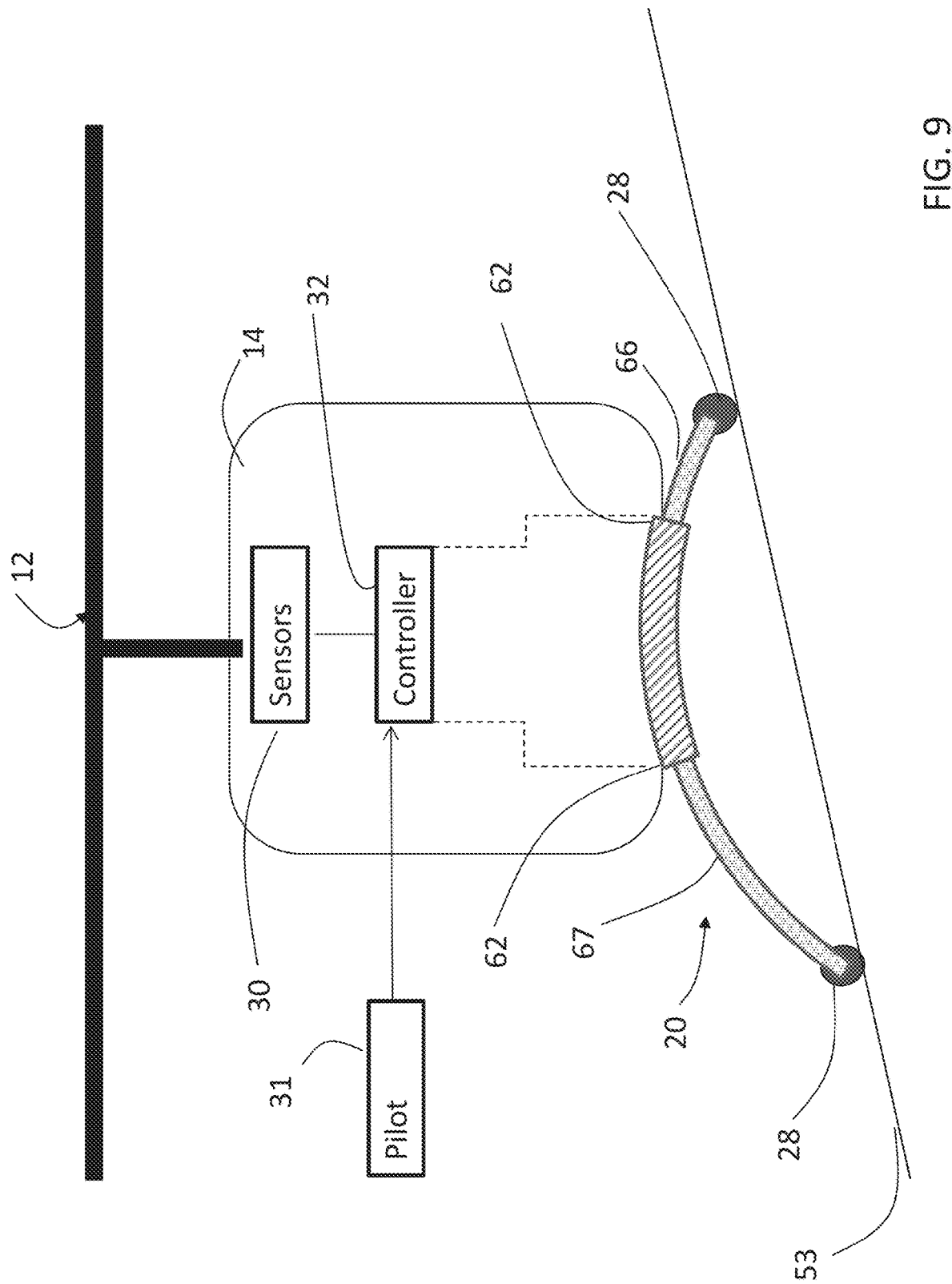

ADAPTIVE LANDING GEAR ASSEMBLY FOR ROTARY WING AIRCRAFT

CROSS REFERENCE TO RELATED APPLICATIONS

This application is a National Stage application of PCT/US2016/039250, filed Jun. 24, 2016, which claims the benefit of U.S. Provisional Application No. 62/184,527, filed Jun. 25, 2015, both of which are incorporated by reference in their entirety herein.

BACKGROUND

The embodiments herein relate to landing gear assemblies for aircraft and, more particularly, to an active landing gear assembly for rotary wing aircraft.

Rotary wing aircraft may experience a condition known as ground resonance. Ground resonance is an imbalance in the rotation of a rotor that causes an oscillation in phase with the frequency of the rocking of the helicopter on its landing gear. Existing solutions passively tune the dynamic response of the landing gear and/or undercarriage to move the resonant frequencies out of the region of concern. Existing solutions may also provide flight control law tuning in the flight control system to address ground resonance. Ground resonance may be precipitated by a hard landing, an asymmetrical ground contact, mechanical failure of a main rotor damper, or other causes.

Additionally, rotary wing aircraft experience challenges when landing on and taking off from sloped surfaces. When touching down on a sloped surface, as the up-slope landing gear touches down, this landing gear imparts a moment on the aircraft which must be counteracted with a moment from the rotor system. If such a moment is not provided by the rotor system, the rotorcraft will roll away from the slope and likely slide down the slope. Existing solutions seek to allow safe landings and the aircraft to "stick" to the slope by inputting rotor system moment to counteract the moment imparted by the landing gear the aircraft as the aircraft touches down on the slope.

BRIEF DESCRIPTION

According to one embodiment, an adaptive landing gear assembly for a rotary wing aircraft includes a controller; a first landing gear support having a first ground contact element; and a second landing gear support having a second ground contact element; the controller independently controlling the first landing gear support and the second landing gear support.

In addition to one or more of the features described above, or as an alternative, further embodiments may include a sensor to monitor at least one condition of the aircraft; the controller independently controlling the first landing gear support and the second landing gear support in response to the sensor.

In addition to one or more of the features described above, or as an alternative, further embodiments may include wherein the sensor monitors oscillation in an airframe of the aircraft or rotor system; and the controller independently controls the first landing gear support and the second landing gear support to dampen oscillation in the airframe or rotor system or to actuate an airframe or rotor system response.

In addition to one or more of the features described above, or as an alternative, further embodiments may include wherein the sensor monitors orientation of a ship deck; and the controller independently controls the first landing gear support and the second landing gear support in response to the orientation of a ship deck.

In addition to one or more of the features described above, or as an alternative, further embodiments may include wherein the sensor monitors orientation of a sloped surface; and the controller independently controls the first landing gear support and the second landing gear support in response to the orientation of the sloped surface.

In addition to one or more of the features described above, or as an alternative, further embodiments may include wherein the first landing gear support and the second landing gear support include fluid, the controller independently controlling fluid in the first landing gear support and fluid in the second landing gear support in response to the sensor.

In addition to one or more of the features described above, or as an alternative, further embodiments may include the fluid is at least one of a liquid and a gas.

In addition to one or more of the features described above, or as an alternative, further embodiments may include a first actuator to position the first landing gear support; a first retention assembly to secure the first landing gear support in a position between fully up and fully down.

In addition to one or more of the features described above, or as an alternative, further embodiments may include a second actuator to position the second landing gear support; a second retention assembly to secure the second landing gear support in a position between fully up and fully down.

In addition to one or more of the features described above, or as an alternative, further embodiments may include wherein the first retention assembly is part of the first actuator.

In addition to one or more of the features described above, or as an alternative, further embodiments may include wherein one or more of a ground contact member extension stop and a ground contact member reaction stop is configured to relieve one or more of tensile and compressive loads experienced by the first or second actuator due to loads applied to the ground contact element when the landing gear support is in a position between full up and full down.

In addition to one or more of the features described above, or as an alternative, further embodiments may include wherein the controller independently controls the first landing gear support and the second landing gear support in response to a human command.

In addition to one or more of the features described above, or as an alternative, further embodiments may include wherein the human command indicates landing on one or more of a flat surface, a sloped surface, a moving surface, a pitching surface, a rolling surface, and a surface attached to a ship.

In addition to one or more of the features described above, or as an alternative, further embodiments may include wherein the first landing gear support includes a first fluid chamber; the second landing gear support includes a second fluid chamber; and a hose fluidly couples the first fluid chamber to the second fluid chamber.

In addition to one or more of the features described above, or as an alternative, further embodiments may include one or more valves positioned in the hose or at the interface between the hose and the first fluid chamber and second fluid chambers to control fluid flow between first fluid chamber and the second fluid chamber; one or more of the controller and a control panel controlling the one or more valves.

In addition to one or more of the features described above, or as an alternative, further embodiments may include an actuator to position the first landing gear support in a position between fully up and fully down.

In addition to one or more of the features described above, or as an alternative, further embodiments may include wherein the actuator is electrically powered.

In addition to one or more of the features described above, or as an alternative, further embodiments may include wherein the ground contact element is a skid.

In addition to one or more of the features described above, or as an alternative, further embodiments may include wherein the first landing gear support and the second landing gear support are part of or connected to one or more skid assemblies.

In addition to one or more of the features described above, or as an alternative, further embodiments may include wherein the sensor monitors one or more of engine health, aircraft vertical and horizontal velocities, rotor speed, aircraft gross weight, landing surface orientation, landing surface motion, human command, or other available sensor data; and the controller configured to determine that a landing is imminent in response to the sensor and terminate active control of the landing gear assembly and one of (i) maintain a current landing gear support state or (ii) control the first landing gear support and second landing gear support to establish one or more of a pre-defined stiffness and extension such that the anticipated high landing loads may be absorbed by the first and second landing gear supports.

BRIEF DESCRIPTION OF THE DRAWINGS

The foregoing and other features and advantages of embodiments are apparent from the following detailed description taken in conjunction with the accompanying drawings in which:

FIG. 6D depicts an actuator and landing gear support in an exemplary embodiment in an extended state;

FIG. 6E depicts an actuator and landing gear support in an exemplary embodiment in a retracted state;

FIG. 9 depicts an adaptive landing gear system for landing on a sloped surface in an exemplary embodiment.

DETAILED DESCRIPTION

Figure 1:
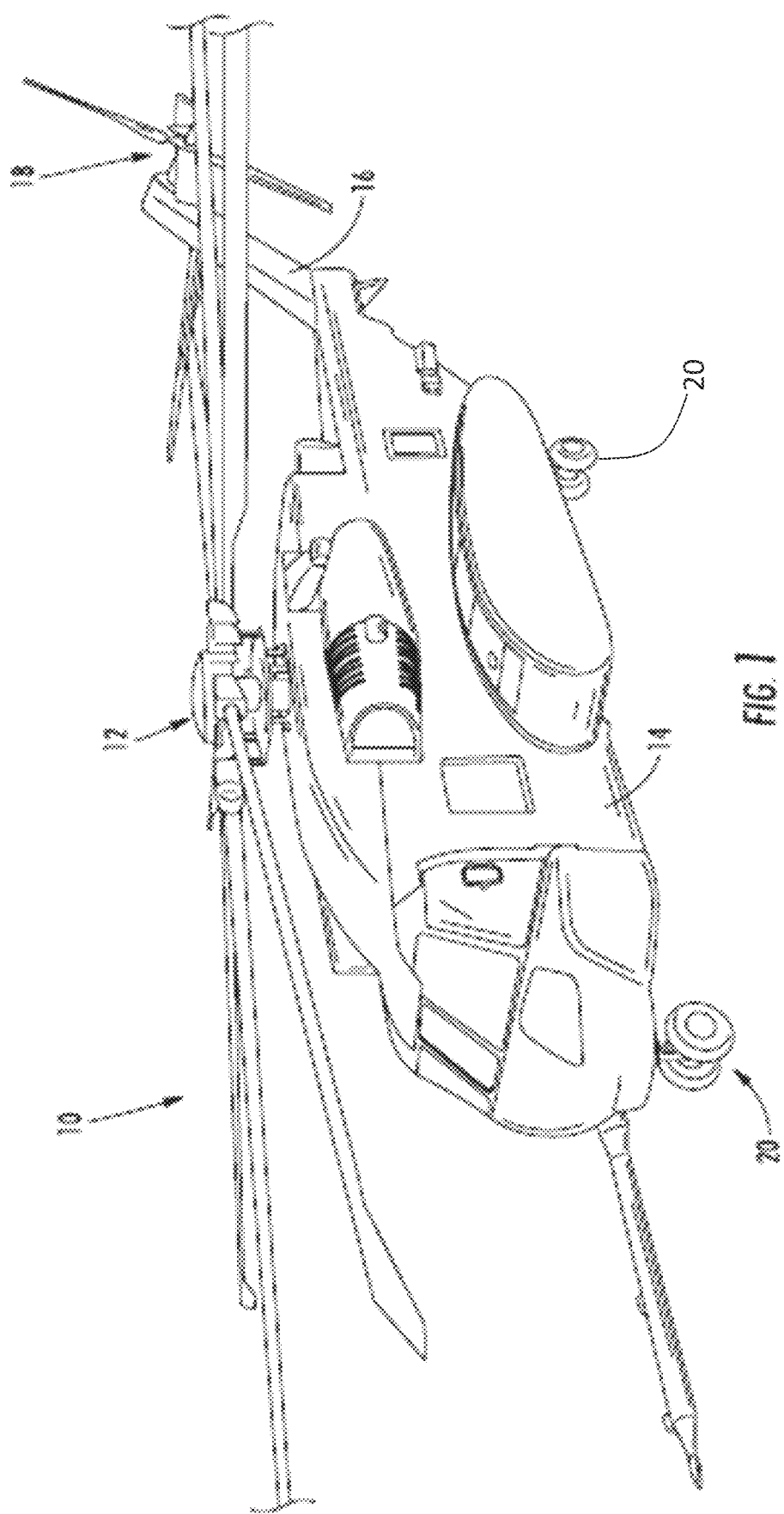
FIG. 1 is a perspective view of a rotary-wing aircraft in an exemplary embodiment.

Referring to FIG. 1, schematically illustrated is a rotary-wing aircraft 10 having a main rotor system 12 in an exemplary embodiment. The aircraft 10 includes an airframe 14 having an extending tail 16 which mounts a tail rotor system 18, such as an anti-torque system. The main rotor assembly 12 is driven through a main power transmission gearbox by one or more engines. The aircraft 10 employs at least one landing gear assembly 20 during landing and while performing land-based maneuvers on a ground surface. Although a particular helicopter configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, quad-copter, multi-rotor lifting bodies, turbo-props, tilt-rotors and tilt-wing aircraft, and the like may also benefit from the embodiments described herein. Aircraft 10 may be a piloted (e.g., a manned aircraft), an unmanned aerial vehicle, optionally piloted vehicle, etc.

Figure 2:
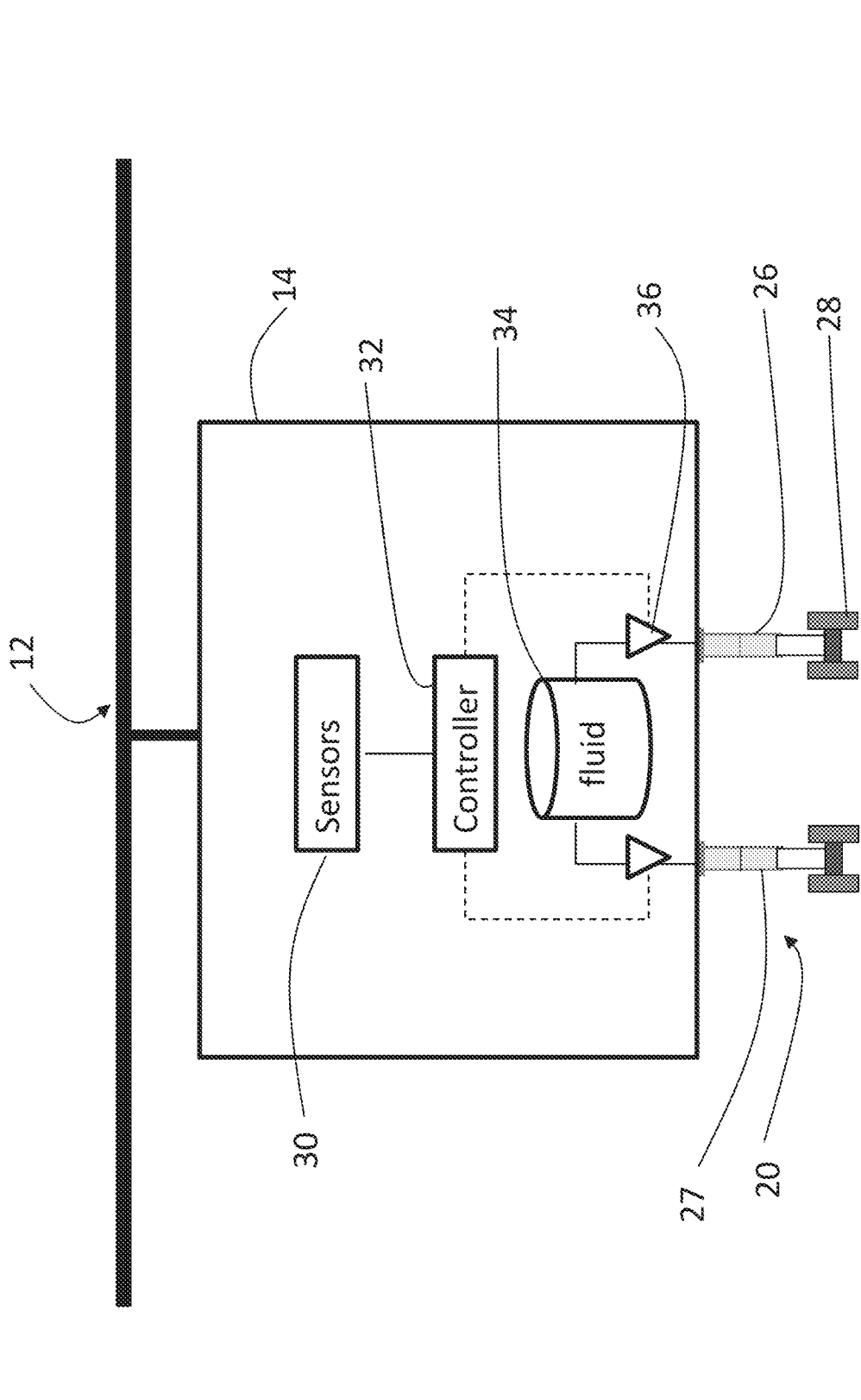
FIG. 2 depicts an adaptive landing gear system for controlling ground resonance in an exemplary embodiment.

FIG. 2 depicts an aircraft including an adaptive landing gear assembly for controlling ground resonance in an exemplary embodiment. The landing gear assembly 20 includes a first landing gear support 26 and a second landing gear support 27. The landing gear supports 26/27 in FIG. 2 may be struts (e.g., oleo struts) that include one or more fluids (e.g., oil, nitrogen) or may be electro-mechanical supports, as described herein. A first end of each landing gear support is coupled to the aircraft frame 14. A second end of each landing gear support 26/27 includes a ground contact member 28, which may be a wheel, skid, etc.

The landing gear assembly 20 of FIG. 2 is controlled by a controller 32 to dampen ground resonance of airframe 14. Ground resonance is a known phenomenon in which oscillations in the main rotor assembly 12 are conveyed to the airframe 14, which can damage the aircraft. The system of FIG. 2 dampens motion of at least one of the airframe 14 and the main rotor assembly 12. Sensors 30 are used to monitor at least one condition, including the state of the airframe 14 or the main rotor assembly 12 (e.g., oscillations) and state of the landing gear assembly 20. Sensors 30 may include motion sensors (e.g., accelerometers and gyros) to detect movement of the airframe in multiple dimensions. Sensors 30 also measure status of the landing gear supports 26/27, including position of each landing gear support, extension of each support, fluid pressure in each support (liquid or gas), weight on each ground contact member 28, etc.

A controller 32 receives signals from the sensors 30 and controls the landing gear assembly 20 to dampen ground resonance motion of airframe 14. A source of fluid 34 (e.g., liquid, gas, or both) is coupled to each landing gear support 26/27 through valves 36. Source of fluid 34 may include one or more pumps to provide pressure (e.g., positive and/or negative) to supply fluid to and from each landing gear support 26/27. Controller 32 monitors oscillations in the airframe 14 caused by ground resonance via sensors 30. Controller 32 controls flow of fluid to/from the landing gear supports 26/27 to generate force(s) on the airframe 14 to counteract and dampen the oscillations. Controller 32 may control fluid traveling to/from the landing gear supports 26/27 using valves 36 (e.g., servo valves) associated with each landing gear support 26/27. Supplying fluid (liquid or gas) to a landing gear support 26/27 causes the support to extend (increase in length with additional hydraulic liquid) or increase the spring rate (increase stiffness with additional gas) whereas removing fluid from a support causes the support to retract (decrease in length by removing hydraulic liquid) or reduce spring rate (decrease stiffness by removing gas). As such, the spring rate and damping characteristics of the landing gear may be controlled by controlling the flow of fluid to/from the landing gear supports 26/27 that subsequently creates force(s) on the airframe 14 to dampen oscillations due to ground resonance. Additionally, while hydraulic fluid is discussed here as affecting only the length and gas is discussed as affecting only the stiffness, it is conceived that in alternate configurations and fluid service levels, hydraulic fluid or gas may each control length and stiffness. Although valves 36 are shown as external to the landing gear supports 26/27, control of extension and/or stiffness of the landing gear supports 26/27 may be controlled by controllable orifice valves internal to each landing gear support 26/27.

In another exemplary embodiment, the landing gear supports 26/27 are controlled by controller 32 to generate a compensating force to rebalance the main rotor assembly 12 to stop or reduce the ground resonance. In this embodiment, the landing gear supports 26/27 are controlled to actuate a response in the airframe 14 to reduce or stop the ground resonance.

It is noted that in the wheels light condition with the shock struts extended and incapable of providing their damping function, the controller 32 may control the fluid to retract the gear to a nominal set point not fully extended and then subsequently control fluid in and out of the landing gear support 26/27 such that the landing gear supports extend and retract with respect to this non-bottomed position. The flow of the fluid in and out of valves 36 while the landing gear supports 26/27 extend and retract may provide the desired damping function with respect to ground resonance.

Alternately, as a light on wheels condition is established during takeoff and the nitrogen charge approaches full extension of the shock strut portion of landing gear support 26/27 in accordance with conventional designs, hydraulic or nitrogen fluid may be removed from the landing gear support 26/27 to soften the spring rate of the landing gear support 26/27 and allow the landing gear support 26/27 to stroke in a light on wheels condition, thus allowing the landing gear support 26/27 to maintain its function as a damper in a wheels light condition. Similarly, for landings, hydraulic or nitrogen fluid may be removed prior to landing such that the landing gear are initially soft and thus provide damping in a light on wheels condition, whereupon fluid is added and stiffness increased as more weight is offloaded from the rotor onto the landing gear support 26/27. In this manner, the landing gear supports 26/27 may provide their damping function over a wider range of weight on wheels conditions.

Additionally, while an initial soft touchdown discussed above may be beneficial for normal landings, doing so may reduce the shock absorption capability and other types of landings (e.g., hard landing due to engine failure or high sink rate) may require increased stiffness and full available stroke of the landing gear supports 26/27 in preparation of a hard landing. For these cases, the controller would monitor sensors including pilot commanded landing gear mode, engine health, aircraft vertical and horizontal velocities, rotor speed, aircraft gross weight, landing surface orientation, landing surface motion, pilot command, or other available sensor data, to determine if termination of adaptive control should be executed. If the controller determines that active control should be terminated, the controller may command one of several actions which include freezing the current landing gear supports 26/27 extension and stiffness states or commanding the landing gear supports 26/27 to a pre-defined state which is appropriate for a hard landing by returning the landing gear supports 26/27 to a pre-defined or fully serviced stiffness and extension state. It is contemplated that the pre-defined stiffness and extension state may be defined in response to sensor data received prior to touchdown and may be different for landing gear support 26 and landing gear support 27 in order to prepare the landing gear supports for a hard landing. Optionally or additionally, the pre-defined stiffness or extension may be defined in response to sensor data prior to touchdown and the one or more landing gear supports 26/27 may have different pre-defined stiffness or extension for embodiments with more than one landing gear support.

Figure 3:
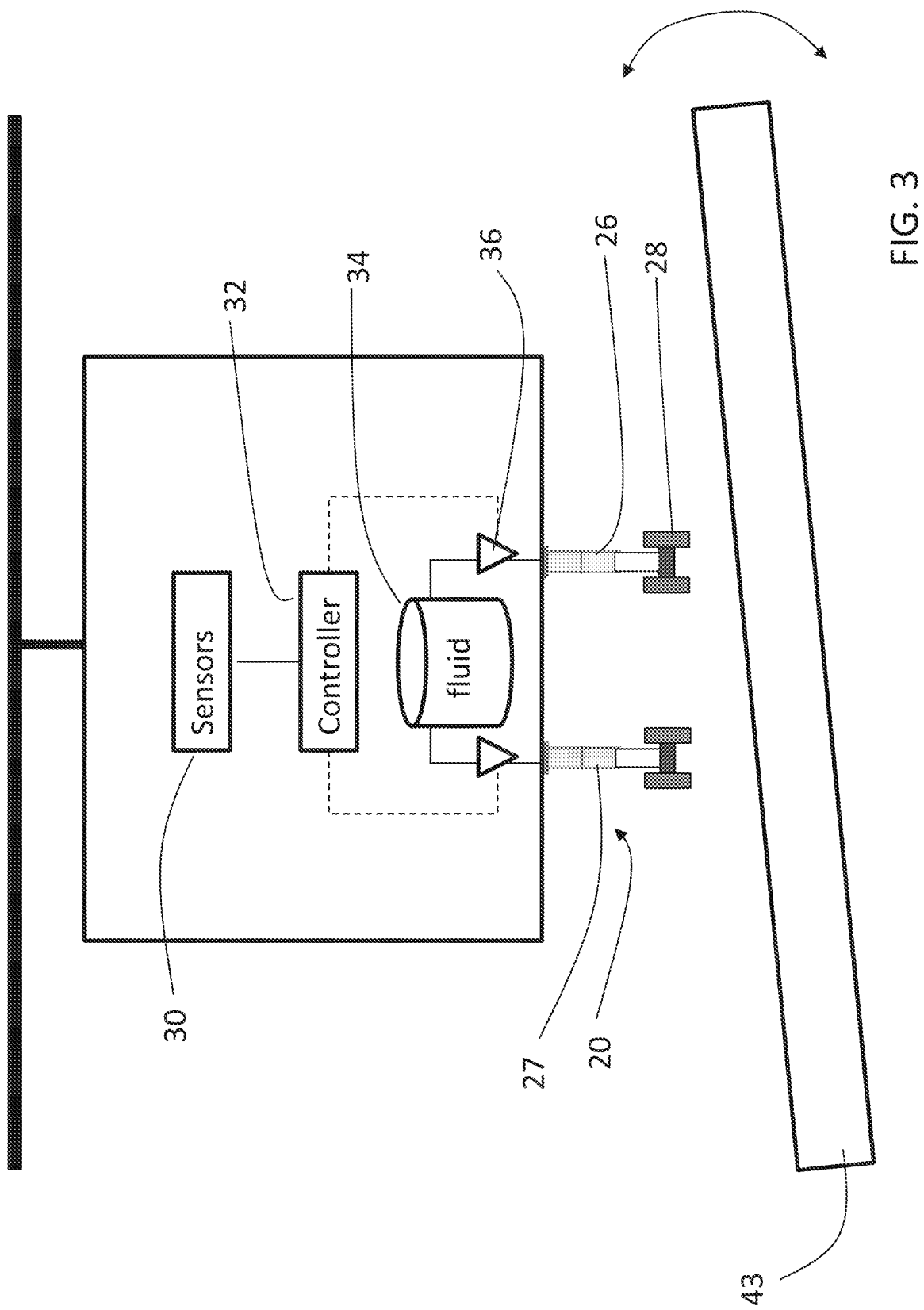
FIG. 3 depicts an adaptive landing gear system for landing on a ship deck in an exemplary embodiment.

FIG. 3 depicts an adaptive landing gear system for landing on a ship deck 43 in an exemplary embodiment. In this embodiment, sensors 30 monitor at least one condition, including detecting the orientation of ship deck 43, in real time. Sensors 30 may include multiple distance sensors (e.g. distance sensors, optical sensors, ultrasonic sensors or the like) which track a plane of ship deck 43 in real time with respect to the aircraft. Sensors 30 are also used to monitor the state of the airframe 14 (e.g., orientation) and state of the landing gear assembly 20. Sensors 30 may include motion sensors (e.g., accelerometers and gyros) to detect movement of the airframe 14 in multiple dimensions. Sensors 30 also measure status of the landing gear supports 26/27, including position of each support, extension of each support, fluid pressure in each support (liquid or gas), weight on each ground contact member 28, etc.

Controller 32 receives signals from the sensors 30 and controls the landing gear assembly 20 such that the inclination of the ground contact members 28 matches the inclination of ship deck 43, along at least one axis. The matching between the inclination of the ground contact members 28 and the inclination of ship deck 43 need not be exact, but sufficient to improve stability in landing the aircraft on rolling deck 43.

A source of fluid 34 (e.g., liquid, gas, or both) is coupled to each landing gear support 26/27 through valves 36. Source of fluid 34 may include one or more pumps to provide pressure (e.g., positive and/or negative) to supply fluid to and from each landing gear support 26/27. Controller 32 monitors an inclination of the deck 43 in real time. Controller 32 controls flow of fluid to/from the landing gear supports 26/27 in real time to extend or retract landing gear supports 26/27 such that the inclination of the ground contact members 28 matches the inclination of ship deck 43. Controller 32 may control fluid traveling to/from the landing gear supports 26/27 using valves 36 (e.g., servo valves) associated with each landing gear support 26/27. Supplying fluid to a landing gear support 26/27 causes the landing gear support to extend or increase in length whereas removing fluid from a landing gear support causes the landing gear support to retract or decrease in length.

Controller 32 may also control the fluid to/from the landing gear supports 26/27 in real time to soften or stiffen the landing gear supports 26/27. For instance fluid (hydraulic or nitrogen) may be removed from the up-slope landing gear support 26 so as to soften the spring force the gear would impart on the aircraft at a given stroke position, and fluid may be added to the down-slope landing gear support 27 such that the landing gear would impart a harder spring force on the aircraft at a given stroke position relative to the up-slope landing gear support 26. Such active control of the spring rate/force of the landing gear reduces the rolling moment imparted by the deck the landing gear supports 26/27. Once the aircraft 10 lands on deck 43, the active control of the landing gear supports 26/27 may be terminated as the aircraft is secured to the deck 43.

Figure 4:
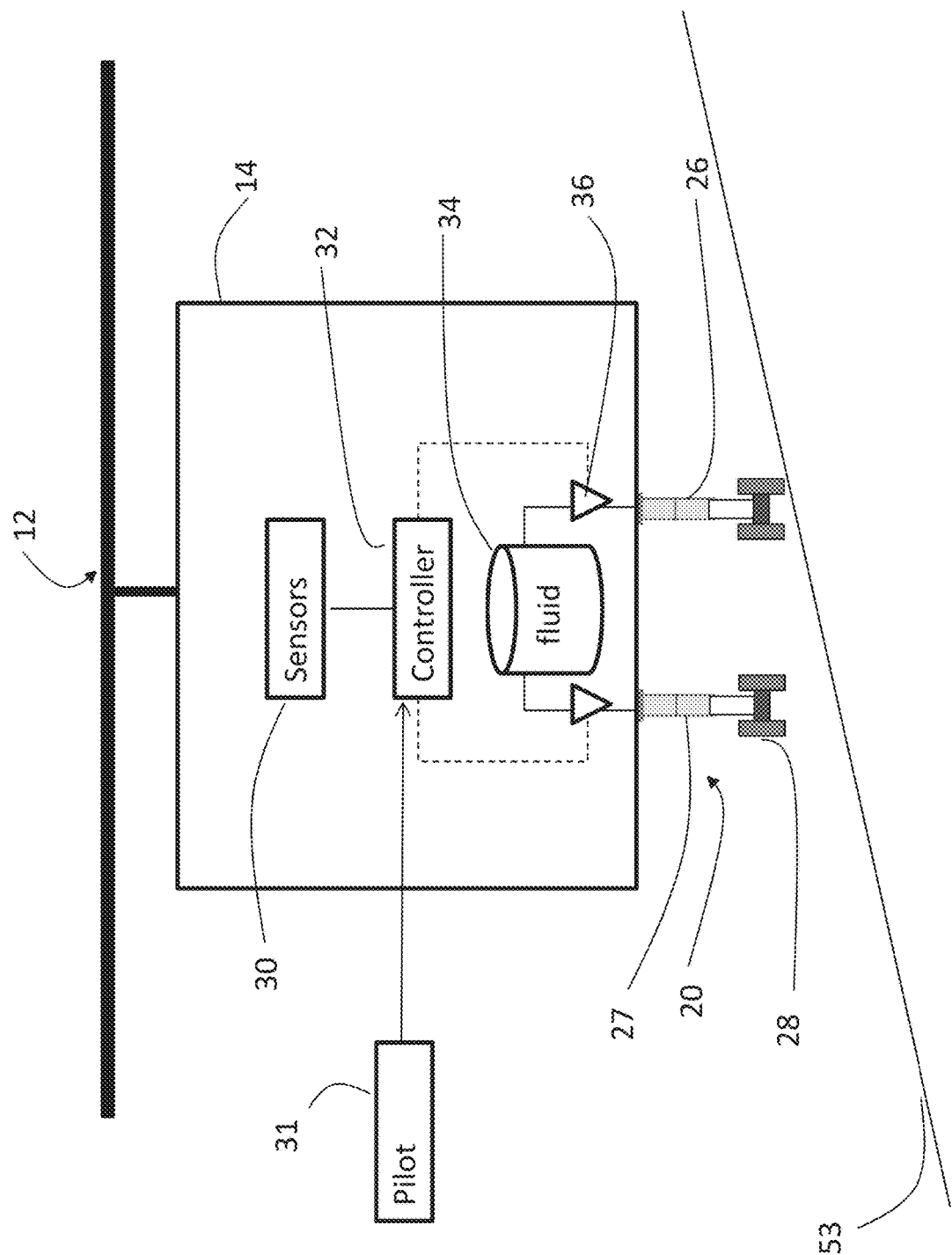
FIG. 4 depicts an adaptive landing gear system for landing on a sloped surface in an exemplary embodiment.

FIG. 4 depicts an adaptive landing gear system for landing on a sloped surface 53 (e.g., a hillside) in an exemplary embodiment. In FIG. 4, sensors 30 monitor at least one condition, including the orientation of the sloped surface 53, in real time. Sensors 30 may include multiple distance sensors (e.g. distance sensors, optical sensors, ultrasonic sensors or the like) which track a plane of sloped surface 53 in real time with respect to the aircraft. Sensors 30 are also used to monitor the state of the airframe 14 (e.g., orientation) and state of the landing gear assembly 20. Sensors 30 may include motion sensors (e.g., accelerometers and gyros) to detect movement of the airframe 14 in multiple dimensions. Sensors 30 also measure status of the landing gear supports 26/27, including position of each support, extension of each support, fluid pressure in each support (liquid or gas), weight on each ground contact member 28, etc.

Controller 32 receives signals from the sensors 30 and controls the landing gear assembly 20 such that the inclination of the ground contact members 28 matches the inclination of sloped surface 53, along at least one axis. The matching between the inclination of the ground contact members 28 and the inclination of sloped surface 53 need not be exact, but sufficient to improve stability in landing the aircraft on sloped surface 53.

A source of fluid 34 (e.g., liquid, gas, or both) is coupled to each landing gear support 26/27 through valves 36. Source of fluid 34 may include one or more pumps to provide pressure (e.g., positive and/or negative) to supply fluid to and from each landing gear support 26/27. Controller 32 may monitor an inclination of the sloped surface 53 in real time. Controller 32 controls flow of fluid to/from the landing gear supports 26/27 in real time to extend or retract landing gear supports 26/27 such that the inclination of the ground contact members 28 matches the inclination of sloped surface 53. Controller 32 may control fluid traveling to/from the landing gear supports 26/27 using valves 36 (e.g., servo valves) associated with each landing gear support 26/27. Supplying fluid (e.g., hydraulic fluid) to a landing gear support 26/27 causes the support to extend or increase in length whereas removing fluid from a support causes the support to retract or decrease in length. Additionally, supplying fluid (e.g., nitrogen gas) to a landing gear support 26/27 may stiffen the spring force of the support whereas removing fluid from a support may soften the spring force of the support.

In other embodiments, a pilot input 31 identifying a commanded inclination of the ground contact members 28 is provided to controller 32. In this embodiment, sensors 30 do not need to sense the inclination of the sloped surface 53. The pilot can command an inclination of the ground contact members 28 based on visual inspection of the sloped surface 53 or based on instrument data (e.g., terrain data). The pilot input 31 may specify a direction (e.g., port/starboard or an aircraft heading) and an amount of inclination (e.g. 3 degrees). The landing gear supports 26/27 are then extended, retracted, stiffened, or softened by controller 32 as necessary to match the requirements of the inclination commanded from the pilot input 31. In this exemplary embodiment, input 31 is describe as a pilot input 31 for ease of description; however, in general, pilot input 31 is conceived to be a human input and may be commanded by another crew member.

Figure 5:
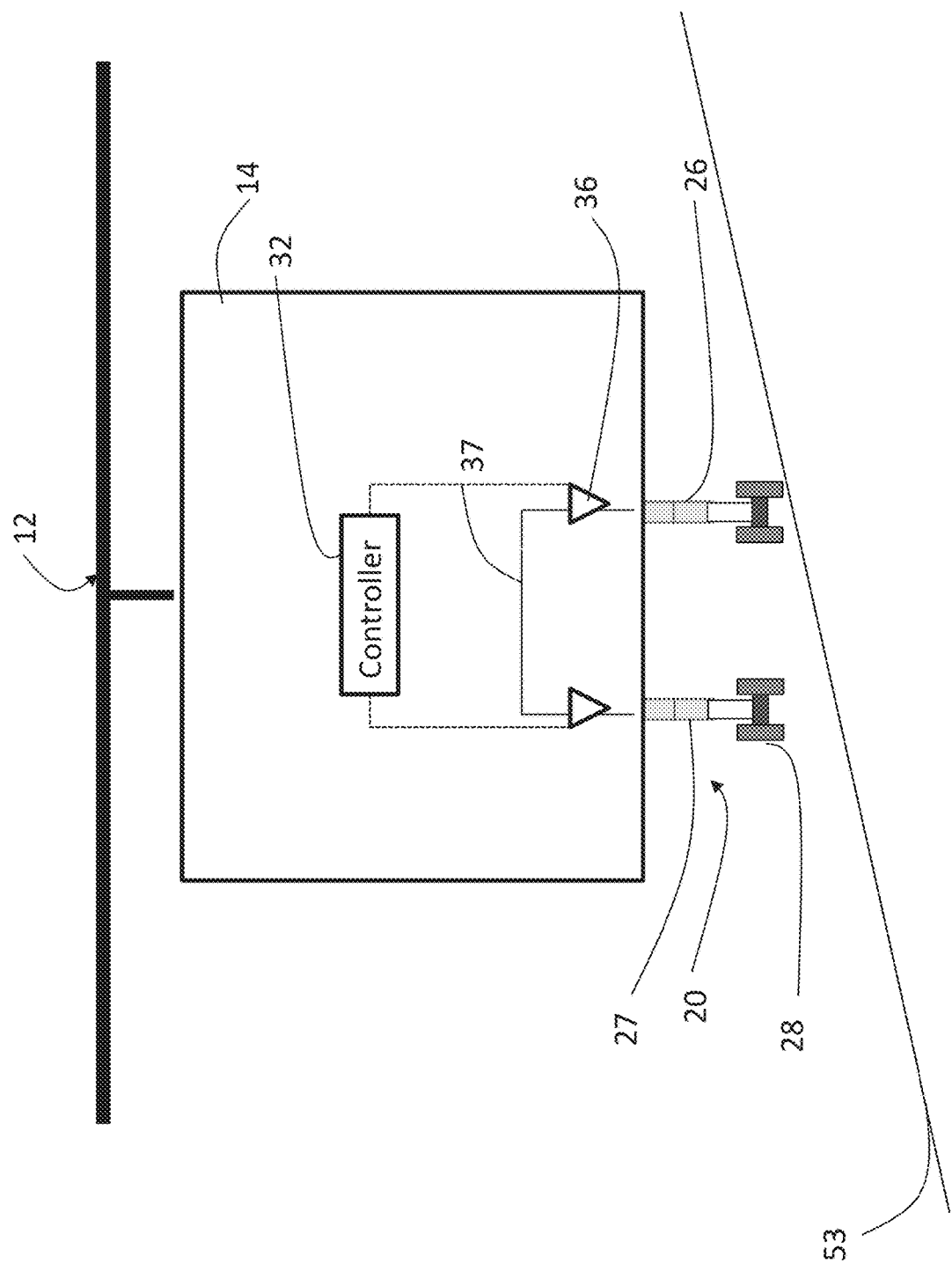
FIG. 5 depicts an adaptive landing gear system for landing on a sloped surface in an exemplary embodiment.

FIG. 5 depicts an adaptive landing gear system for landing on a sloped surface 53 in an exemplary embodiment. In FIG. 5, the landing gear supports 26/27 extend or retract in a passive manner. Respective fluid chambers (e.g., liquid, gas or both) from each landing gear support 26/27 are fluidly coupled to each other. Valves 36 (e.g., servo valves) and a hose 37 may be used to fluidly couple fluid chambers between the landing gear supports 26/27. As the aircraft 10 touches down, landing gear support 26 contact sloped surface 53 first. This cause landing gear support 26 to be compressed and retract, driving fluid to landing gear support 27. Fluid transferred to landing gear support 27 may cause landing gear support 27 to extend away or from the airframe 14 or stiffen depending upon landing gear support 26/27 configuration.

Controller 32 may be used to close valves 36 to prevent further fluid coupling between the landing gear supports 26/27 once the aircraft has landed or pre-defined maximum fluid transfer limit has been reached. The net result is the inclination of the ground contact members 28 partially or completely matching the inclination of the sloped surface and a reduction in the rotor hub moment required to maintain the aircraft on the slope during transitions to/from the sloped surface. Controller 32 may be implemented as a digital computer, analog computer, or the like. Alternately, controller 32 may be a control panel wherein the pilot or a crew member may directly command the valve position electrically, mechanically, hydraulically, electro-mechanically, or the like through any combination of various switches, knobs, buttons, levers, handles, or other human interface devices.

Figure 6A:
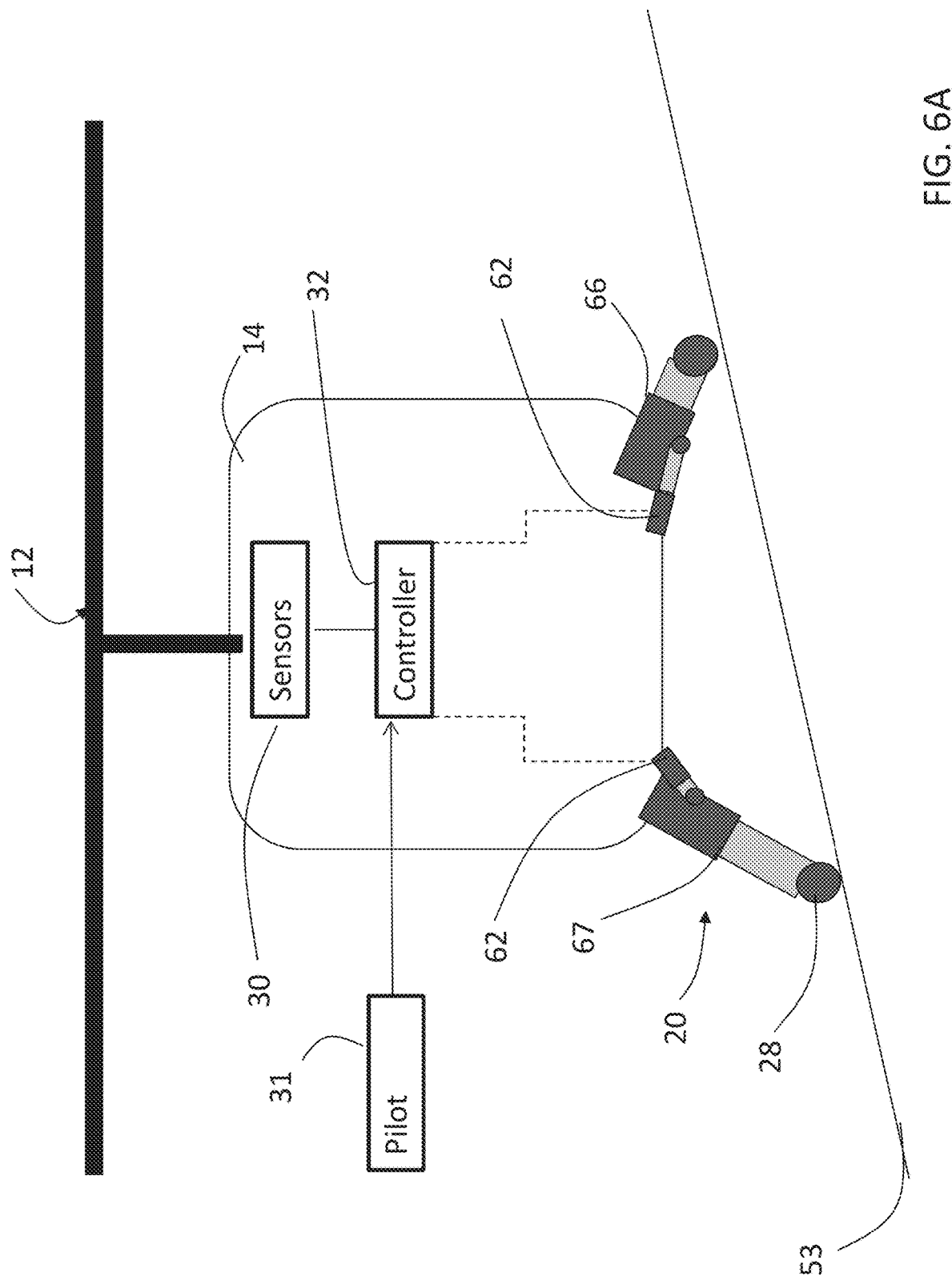
FIG. 6A depicts an adaptive landing gear system for landing on a sloped surface in an exemplary embodiment.

FIG. 6A depicts an adaptive landing gear system for landing on a sloped surface 53 (e.g., a hillside) in an exemplary embodiment. In FIG. 6A, the landing gear supports 66/67 are mechanically extended or retracted by actuators 62 (e.g., electric motors or hydraulic) analogous to actuators used to move landing gear between a "gear extended" and a "gear retracted" position, rather than hydraulics which may extend the landing gear supports 26/27 themselves as shown in FIG. 2, FIG. 3, and FIG. 4. Landing gear supports 66/67 are part of a mechanical assembly that is used to raise or lower the landing gear assembly 20. In conventional landing gear, the supports are either fully raised or fully lowered, and do not assume intermediate positions. The landing gear supports 66/67 can be partially extended from airframe 14, to accommodate landing on sloped surface 53.

In FIG. 6A, sensors 30 monitor at least one condition, including the orientation of the sloped surface 53, in real time. Sensors 30 may include multiple distance sensors (e.g. distance sensors, optical sensors, ultrasonic sensors or the like) which track a plane of sloped surface 53 in real time. Sensors 30 are also used to monitor the state of the airframe 14 (e.g., orientation) and state of the landing gear assembly 20. Sensors 30 may include motion sensors (e.g., accelerometers) to detect movement of the airframe 14 in multiple dimensions. Sensors 30 also measure status of the landing gear supports 66/67, including position of each support, extension of each support under compression, weight on each ground contact member 28, etc.

Controller 32 receives signals from the sensors 30 and controls the landing gear assembly 20 such that the inclination of the ground contact members 28 matches the inclination of sloped surface 53, along at least one axis. The matching between the inclination of the ground contact members 28 and the inclination of sloped surface 53 need not be exact, but sufficient to improve stability in landing the aircraft on sloped surface 53.

Controller 32 may monitor an inclination of the sloped surface 53 in real time. Controller 32 controls actuators 62 in real time to extend or retract landing gear supports 66/67 such that the inclination of the ground contact members 28 matches the inclination of sloped surface 53.

In other embodiments, a pilot input 31 identifying a commanded inclination of the ground contact members 28 is provided to controller 32. In this embodiment, sensors 30 do not need to sense the inclination of the sloped surface 53. The pilot can command an inclination of the ground contact members 28 based on visual inspection of the sloped surface 53 or based on instrument data (e.g., terrain data). The pilot input 31 may specify a direction (e.g., port/starboard or an aircraft heading) and an amount of inclination (e.g. 3 degrees). The landing gear supports 66/67 are then extended or retracted by controller 32 as necessary to match the commanded inclination from the pilot input 31.

Figure 6C:
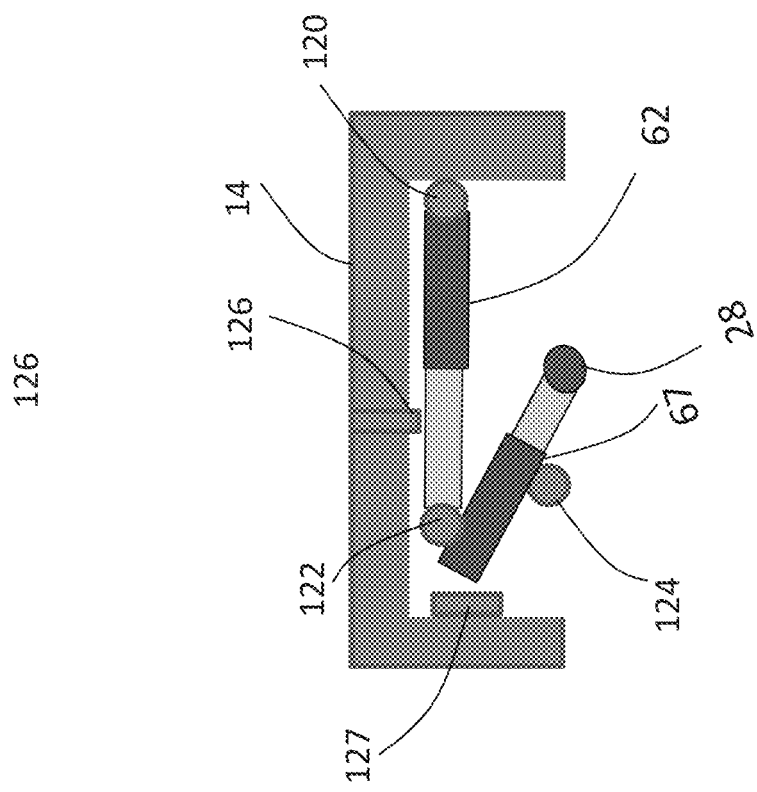
FIG. 6C depicts an actuator and landing gear support in an exemplary embodiment in a retracted state.
Figure 6B:
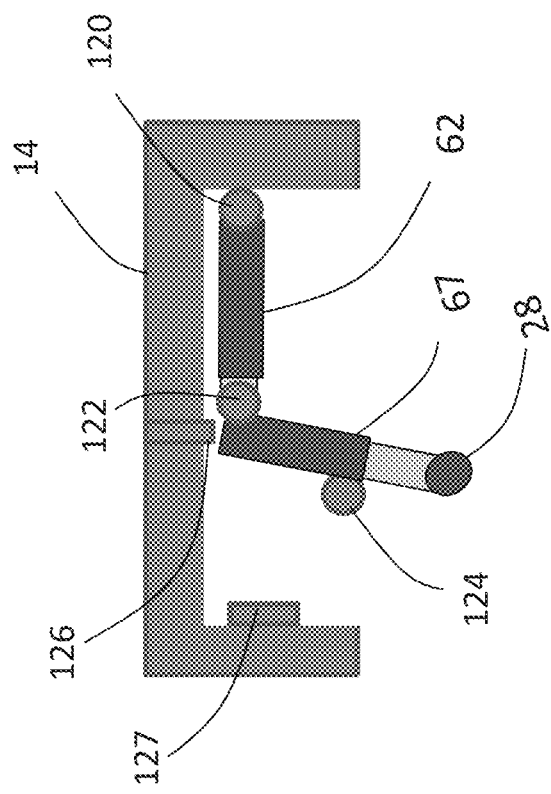
FIG. 6B depicts an actuator and landing gear support in an exemplary embodiment in an extended state.

FIG. 6B depicts mounting of an actuator 62 and a support 67 in an exemplary embodiment. Actuator 62 is connected to the airframe 14 at an actuator-airframe pivot 120. Actuator 62 is connected to the support 67 at an actuator-support pivot 122. Support 67 is connected to the airframe 14 at a support-airframe pivot 124. FIG. 6B shows the actuator 62 fully retracted, resulting in a full extension of support 67. FIG. 6C shows the actuator 62 fully extended, resulting in a full retraction of support 67. When support 67 is in the fully extended state, a ground contact member extension stop 126 may be used at the top of support 67 to alleviate compression loads on actuator 62. The ground contact member extension stop 126 is located as needed for the particular landing gear design.

In FIG. 6B and FIG. 6C, actuator 62 will be in tension in a partially retracted state when a vertical load is applied to ground contact member 28 when the aircraft touches down and the support 67 receives a rotating moment about support-airframe pivot 124. When in the partially retracted state, this tension may be relieved by a movable ground contact member retraction stop 127. While FIG. 6B and FIG. 6C do not depict the movable nature of the ground contact member reaction stop 127, it is contemplated that one or more movable or deployable ground contact member retraction stops 127 may be employed to assist in providing structural integrity at various partial retraction states and act as a retention assembly to counteract the rotating moment applied to support 67 as a vertical load is applied to ground contact member 28 while the support 67 is in a partially retracted state.

Actuator 62 may be configured to provide damping when in a partially retracted state as the vertical damping of support 67 will be diminished as support 67 is retracted. This may be performed by integrating a shock strut mechanism within the actuator 62 in series with a locking mechanism, or may be performed by actively pumping fluid in and out of the retract actuator 62 to provide a damping function.

FIG. 6D and FIG. 6E show landing gear in another embodiment. FIGS. 6D and 6E are similar to FIG. 6B and FIG. 6C, except for the location of the pivots 120, 122 and 124. FIG. 6D shows the actuator 62 fully extended, resulting in a full extension of support 67. FIG. 6E shows the actuator 62 fully retracted, resulting in a full retraction of support 67. Actuator 62 would accept compressive loads while in a partially retracted state during landing.

Figure 7:
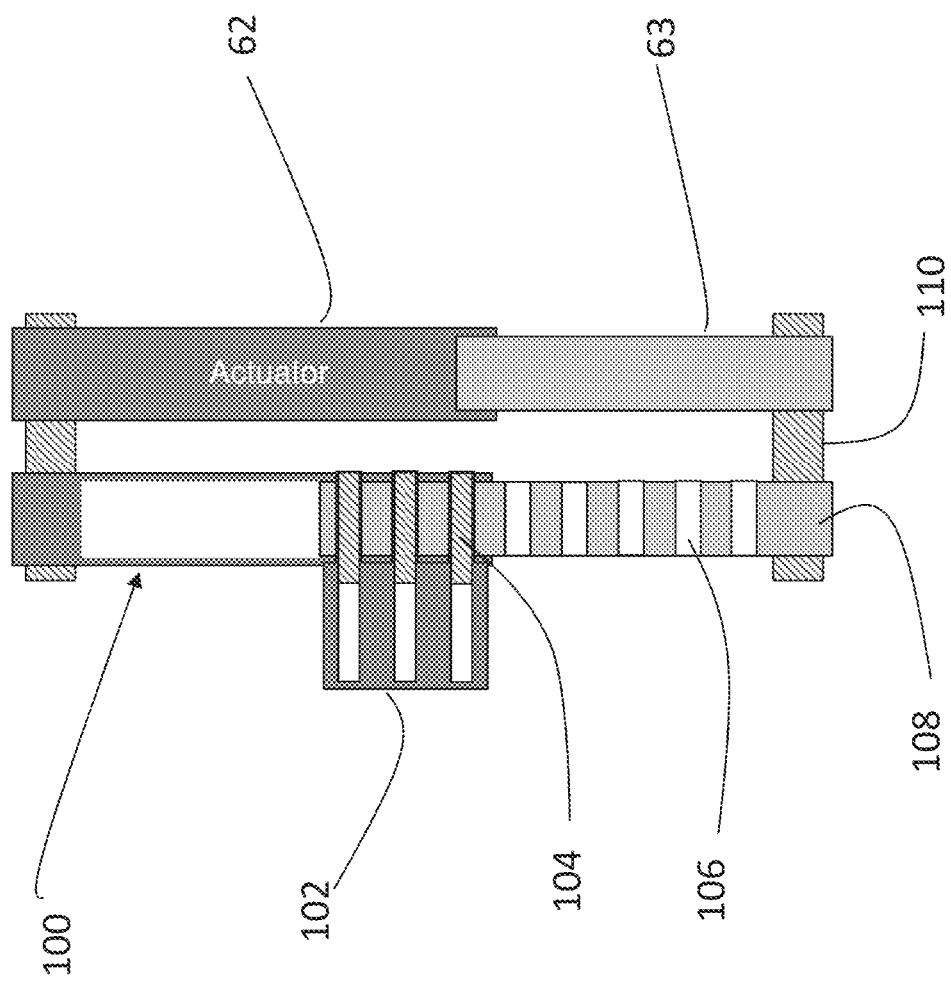
FIG. 7 depicts an adaptive landing gear actuator and retention assembly in an exemplary embodiment.

Each landing gear support 66/67 may utilize a retention assembly to secure the landing gear support 66/67 in an intermediate position between the typical fully up and fully down positions and fulfills the function of actuator 62 described in FIGS. 6A-6E. FIG. 7 illustrates an exemplary retention assembly 100 for holding the landing gear supports 66/67 in multiple secured positions between the fully up and fully down positions. The retention assembly 100 includes a lock actuator 102 that controls one or more pins 104. The pins 104 engage openings 106 (e.g., holes, detents) in a rack 108 that moves with movement of the actuator 62. Rack 108 is connected to an actuator arm 63 through a link 110. Actuator arm 63 moves a landing gear support 66/67 away from or towards airframe 14.

Lock actuator 102 may include springs that bias the pins 104 away from the rack 108. Lock actuator 102 may include a solenoid that extends the pins 104 towards the rack 108 to engage openings 106. During landing, the actuator 62 drives arm 63 to the proper position to extend/retract a landing gear support 66/67 to the proper location to accommodate the sloped surface 53. Once actuator 62 has driven actuator arm 63 to the proper location, the lock actuator 102 can be controlled to drive pins 104 into engagement with openings 106 in rack 108. Force on the landing gear supports 66/67 is now applied to the retention assembly 100, rather than actuator 62. It is noted that alternate embodiments of retention assembly 100 may integrate the lock actuator 102, pins 104, openings 106, and rack 108, into the actuator 62 or alternately provide an actuator 62 of sufficient strength such that it may transmit the entirety of the retention loads transmitted through retention assembly 100 which may be heavier, but would allow more variation in selection of extension lengths. FIG. 7 depicts an exemplary retention assembly 100 and embodiments are not limited to the retention assembly of FIG. 7.

Figure 8A:
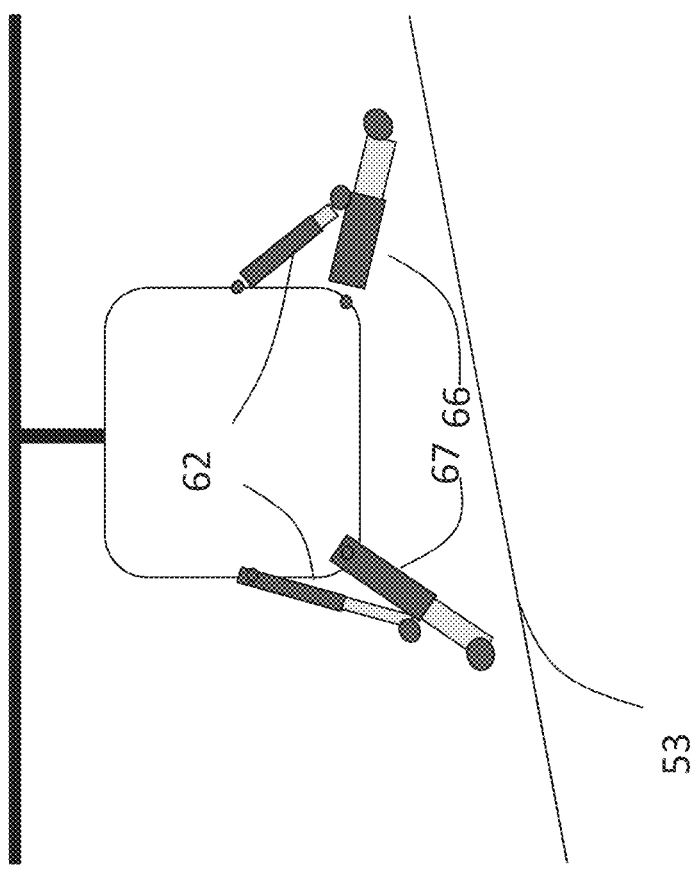
FIG. 8A depicts an adaptive landing gear system for landing on a sloped surface in an exemplary embodiment.
Figure 8C:
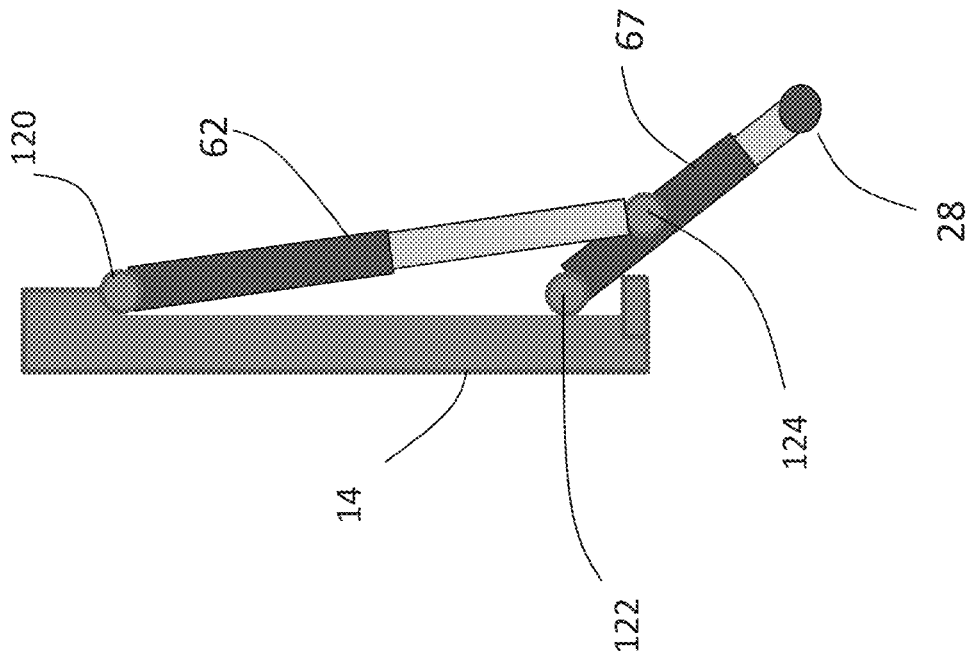
FIG. 8C depicts an actuator and landing gear support in an exemplary embodiment.
Figure 8B:
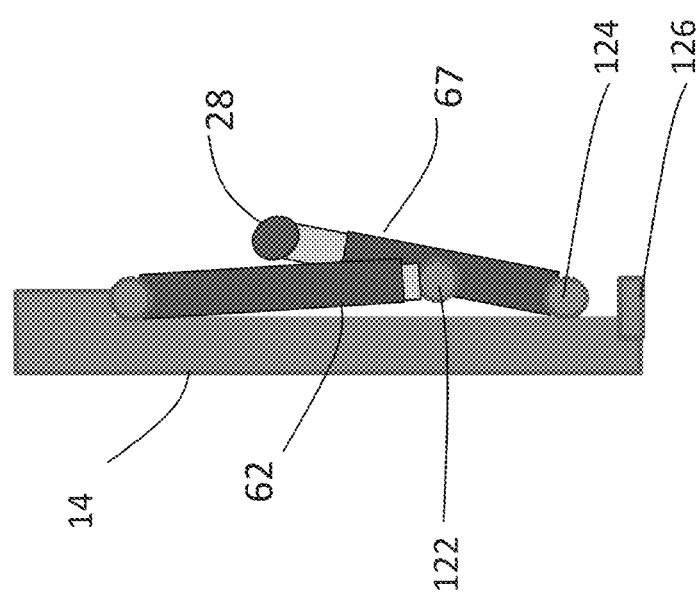
FIG. 8B depicts an actuator and landing gear support in an exemplary embodiment.

FIGS. 8A-8C depict landing gear supports 66/67 mechanically extended or retracted by actuators 62 in an exemplary embodiment. The actuators 62 are arranged more vertically than those in FIGS. 6B-6E. Components similar those in FIGS. 6B-6E are labeled with similar reference numerals. As noted above, actuators 62 may be configured to provide damping and may be used in conjunction with a retention assembly.

Figure 8D:
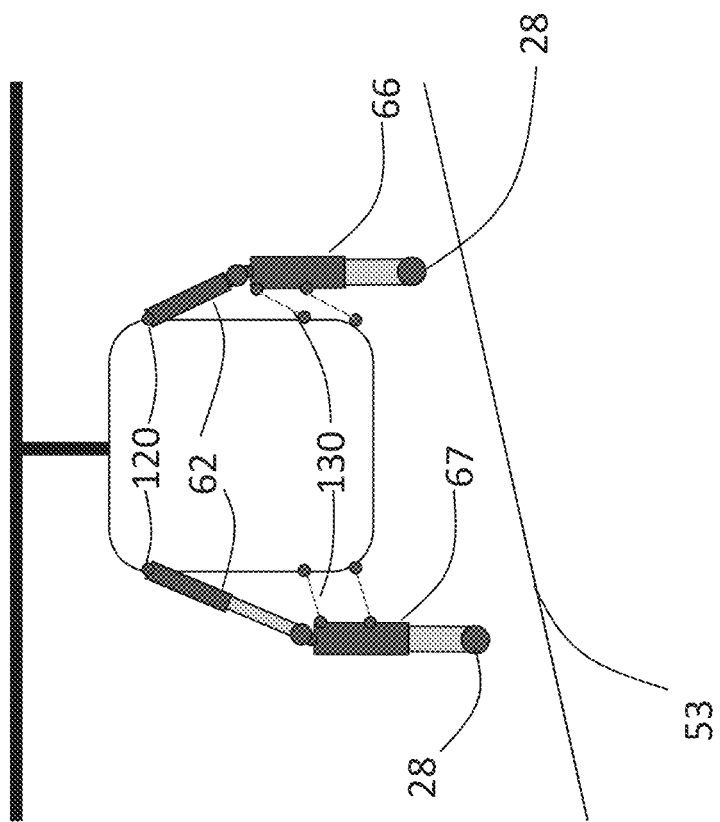
FIG. 8D depicts an adaptive landing gear system for landing on a sloped surface in an exemplary embodiment.

FIG. 8D depicts landing gear supports 66/67 mechanically extended or retracted by actuators 62 in another exemplary embodiment. In FIG. 8D the supports 66/67 are coupled to the aircraft frame 14 by four bar linkages 130. As noted above, actuators 62 may be configured to provide damping and may be used in conjunction with a retention assembly. In FIG. 8D, the ground contact members 28 may be extended and retracted while keeping the supports 66/67 in a primarily vertical orientation. As such, the supports 66/67 may maintain their full damping function without additional damping being provided by the retract actuator 62 load path. Alternate four bar linkage embodiments may have less symmetric linkage lengths, allow rotation of supports 66/67 through extension and retraction, and may relocate the actuator-airframe pivot 120 to a location between four bar linkages 130 depending upon aircraft type. FIG. 8 depicts an exemplary four bar linkage embodiment and embodiments are not limited to the embodiment depicted in FIG. 8.

FIG. 9 depicts an embodiment in which the supports 66/67 are in the form of a unitary bar, similar to a skid. Supports 66/67 are extended and retracted (in an inverse manner) by actuator 62. That is, as support 67 is extended, support 66 is retracted, and vice versa. Supports 66/67 travel along actuator 62, which may be electrical, hydraulic, pneumatic, etc. Actuator 62 may be configured to provide damping and may be used in conjunction with a retention assembly, as described herein. The actuator 62, and consequently support 66 and support 67, may be primarily oriented along the longitudinal axis, lateral axis, a combination of the longitudinal and lateral axis, or along any other axis of airframe 14 as appropriate for aircraft type.

Figure 10:
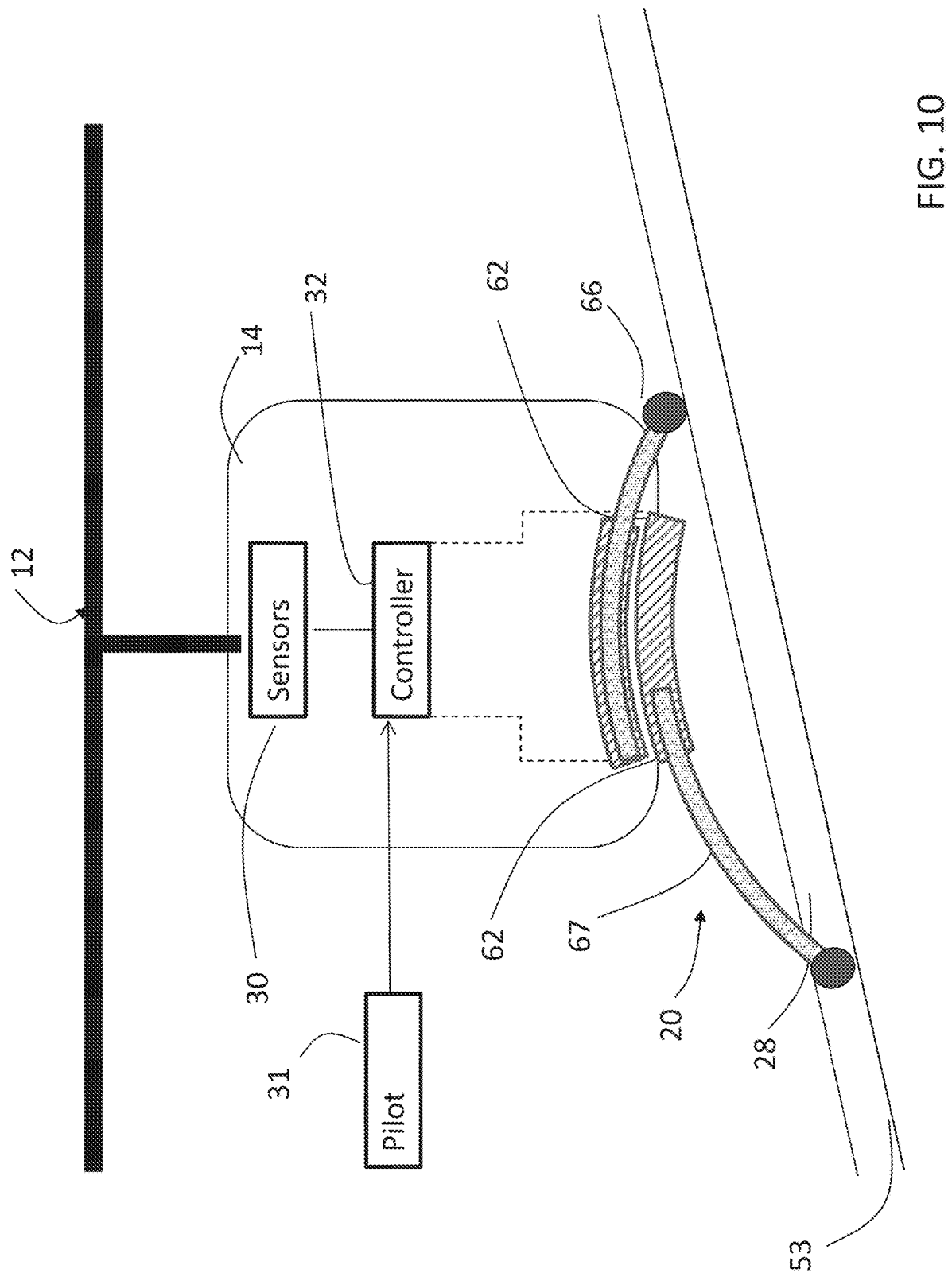
FIG. 10 depicts an adaptive landing gear system for landing on a sloped surface in an exemplary embodiment.

FIG. 10 depicts an embodiment in which the supports 66/67 are in the skids, but not unitary as shown in FIG. 9. Each support 66/67 may move independently of the other, in response to actuators 62. Actuators 62 may be located fore and aft, left or right, or obliquely with respect to each other on airframe 14. Additionally, actuators and supports may be primarily aligned with any axis of airframe 14 as appropriate for aircraft type. Supports 66/67 travel along actuators 62, which may be electrical, hydraulic, pneumatic, etc. Actuators 62 may be configured to provide damping and may be used in conjunction with a retention assembly, as described herein.

While a limited number of embodiments have been described, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. An adaptive landing gear assembly for a rotary wing aircraft, the adaptive landing gear assembly comprising:
   a controller;
   a first landing gear support having a first ground contact element; and
   a second landing gear support having a second ground contact element;
   a sensor to monitor at least one condition of the aircraft; and
   the controller independently controlling the first landing gear support and the second landing gear support in response to the sensor;
   wherein the sensor monitors oscillation in an airframe of the aircraft or in a rotor system of the aircraft and the controller independently controls the first landing gear support and the second landing gear support to actuate an airframe response or rotor system response that dampens oscillation in the airframe or the rotor system due to ground resonance.

2. The adaptive landing gear assembly of claim 1, wherein:
   the sensor monitors orientation of a ship deck; and
   the controller independently controls the first landing gear support and the second landing gear support in response to the orientation of the ship deck.

3. The adaptive landing gear assembly of claim 1, wherein:
   the sensor monitors orientation of a sloped surface; and
   the controller independently controls the first landing gear support and the second landing gear support in response to the orientation of the sloped surface.

4. The adaptive landing gear assembly of claim 1, wherein:
   the first landing gear support and the second landing gear support include fluid, the controller independently controlling fluid in the first landing gear support and fluid in the second landing gear support in response to the sensor.

5. The adaptive landing gear assembly of claim 4, wherein:
   the fluid is at least one of a liquid and a gas.

6. The adaptive landing gear assembly of claim 1, further comprising:
   a first retention assembly to secure the first landing gear support in a position between fully up and fully down, the first retention assembly comprising a first actuator to position the first landing gear support.

7. The adaptive landing gear assembly of claim 6, further comprising:
   a second retention assembly to secure the second landing gear support in a position between fully up and fully down, the second retention assembly comprising a second actuator to position the second landing gear support.

8. The adaptive landing gear assembly of claim 7, further comprising:
   a ground contact member extension stop configured to relieve compressive loads experienced by the first or second actuator when the associated landing gear support is in a fully extended position or a ground contact member retraction stop configured to relieve tensile loads experienced by the first or second actuator due to loads applied to the associated ground contact element when the associated landing gear support is in a position between full up and full down.

9. The adaptive landing gear assembly of claim 1, wherein:
   the controller independently controls the first landing gear support and the second landing gear support in response to a human command.

10. The adaptive landing gear assembly of claim 9, wherein:
    the human command indicates landing on one or more of a flat surface, a sloped surface, a moving surface, a pitching surface, a rolling surface, and a surface attached to a ship.

11. The adaptive landing gear assembly of claim 1, wherein:
    the first landing gear support includes a first fluid chamber;
    the second landing gear support includes a second fluid chamber; and
    a hose fluidly couples the first fluid chamber to the second fluid chamber.

12. The adaptive landing gear assembly of claim 11, further comprising:
    one or more valves positioned in the hose, at the interface between the hose and the first fluid chamber, or at the interface between the hose and the second fluid chamber to control fluid flow between first fluid chamber and the second fluid chamber;
    one or more of the controller and a control panel controlling the one or more valves.

13. The adaptive landing gear assembly of claim 1, further comprising:
    an actuator to position the first landing gear support in a position between fully up and fully down.

14. The adaptive landing gear assembly of claim 13, wherein:
    the actuator is electrically powered.

15. The adaptive landing gear assembly of claim 1, wherein:

the first or second ground contact element is a skid.

16. The adaptive landing gear assembly of claim 15, further comprising:
   one or more skid assemblies, the one or more skid assemblies comprising the first landing gear support and the second landing gear support.

17. The adaptive landing gear assembly of claim 1, wherein:
   the sensor monitors one or more of engine health, aircraft vertical and horizontal velocities, rotor speed, aircraft gross weight, landing surface orientation, landing surface motion, human command, oscillations of an airframe of the aircraft, oscillations of a rotor system of the aircraft, orientation of the airframe, state of the first landing gear support, state of the first ground contact element, state of the second landing gear support, or state of the second ground contact element; and
   the controller configured to determine that a landing is imminent in response to the sensor and terminate active control of the landing gear assembly and one of (i) maintain a current landing gear support state or (ii) control the first landing gear support and second landing gear support to establish one or more of a predefined stiffness and extension such that the anticipated landing loads may be absorbed by the first and second landing gear supports.

* * * * *